US006520475B2

(12) United States Patent
Haun et al.

(10) Patent No.: US 6,520,475 B2
(45) Date of Patent: Feb. 18, 2003

(54) SPLIT FOOT DAMPER

(75) Inventors: Steven William Haun, Landisville, PA (US); Gary Lee Diven, Lancaster, PA (US); Joseph Arthur Reed, York, PA (US)

(73) Assignee: Thomson Licensing S. A., Boulogne Cedex (FR)

( * ) Notice: Subject to any disclaimer, the term of this patent is extended or adjusted under 35 U.S.C. 154(b) by 177 days.

(21) Appl. No.: 09/775,228

(22) Filed: Feb. 1, 2001

(65) Prior Publication Data

US 2002/0101147 A1 Aug. 1, 2002

(51) Int. Cl.[7] .................................................. F16M 1/00

(52) U.S. Cl. ........................ 248/636; 181/207; 313/402; 313/407

(58) Field of Search ................................. 313/402, 404, 313/407; 445/30, 47; 181/207, 208, 209; 248/636, 638, 562, 917, 918

(56) References Cited

U.S. PATENT DOCUMENTS

| | | | | | |
|---|---|---|---|---|---|
| 3,832,592 | A | * | 8/1974 | Yamazaki | 313/284 |
| 3,894,260 | A | * | 7/1975 | Sedivy | 313/405 |
| 4,827,179 | A | * | 5/1989 | Adler et al. | 313/269 |
| 4,828,202 | A | * | 5/1989 | Jacobs et al. | 118/268 |
| 5,214,349 | A | * | 5/1993 | Sakata et al. | 313/348 |
| 5,289,080 | A | * | 2/1994 | Park | 313/402 |
| 6,188,168 | B1 | * | 2/2001 | Han et al. | 313/402 |
| 6,388,367 | B1 | * | 5/2002 | Taguchi | 313/269 |

FOREIGN PATENT DOCUMENTS

| | | | | | |
|---|---|---|---|---|---|
| JP | 09045256 | A | * | 2/1997 | H01J/29/02 |
| JP | 11250825 | A | * | 9/1999 | H01J/29/07 |
| WO | WO 02/39477 | A | * | 5/2002 | H01J/29/07 |

* cited by examiner

*Primary Examiner*—Robert Beatty
(74) *Attorney, Agent, or Firm*—Joseph S. Tripoli; Joseph I. Laks; Carlos M. Herrera

(57) ABSTRACT

A split foot damper for damping vibrational energy on a tension mask having a border with an edge. The apparatus has a first element having a first portion in moveable contact with a surface of the border and a second portion in moveable contact with the edge of the border, and a second element having a third portion in moveable contact with the surface of the border and a fourth portion in moveable contact with the edge of the border, where the two elements are connected to each other at a point that is affixed to the surface of the border. As the mask vibrates, the vibrational energy is transferred to the split foot damper, wherein vibrational energy is dissipated as the portions of the split foot damper makes contact against the surface and edge of the border.

11 Claims, 4 Drawing Sheets

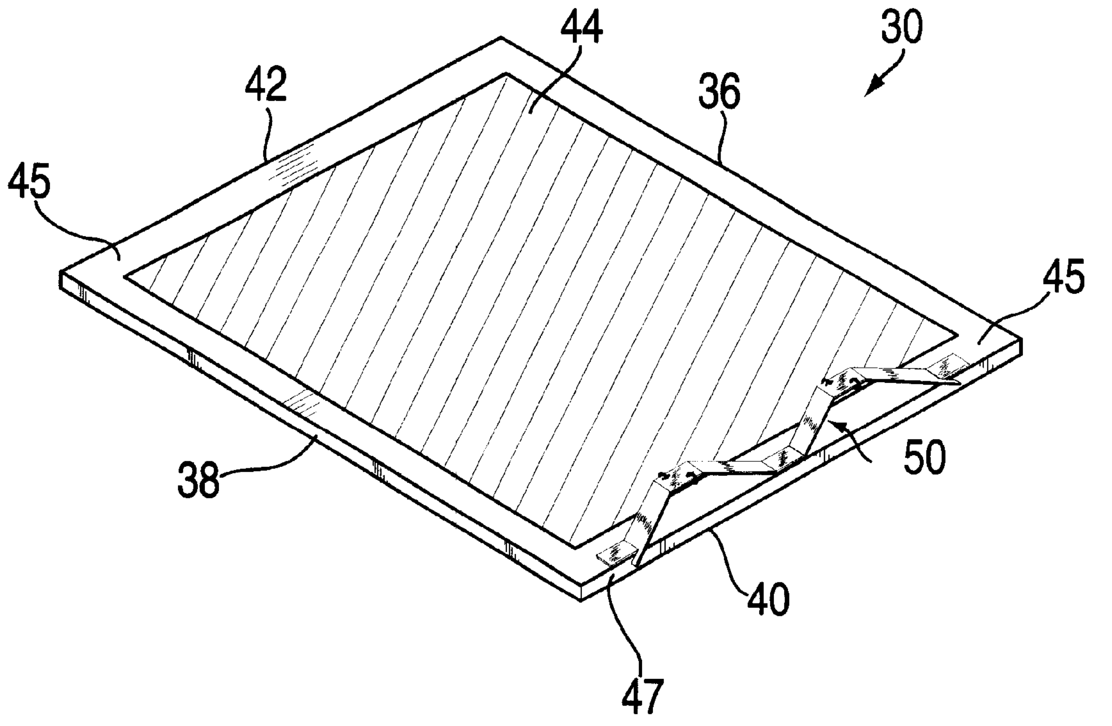
FIG. 2
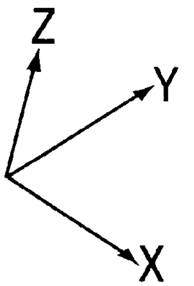

SPLIT FOOT DAMPER

This invention generally relates to cathode ray tubes and, more particularly, to a split foot damper for reducing vibrational energy in a tension mask of a cathode ray tube.

BACKGROUND OF THE INVENTION

A color picture tube includes an electron gun for forming and directing three electron beams to a screen of the tube. The screen is located on the inner surface of the faceplate of the tube and comprises an array of elements of three different color-emitting phosphors. An aperture mask is interposed between the gun and the screen to permit each electron beam to strike only the phosphor elements associated with that beam. The aperture mask is a thin sheet of metal, such as alloy steel, that is contoured to somewhat parallel the inner surface of the tube faceplate. The aperture mask may be either formed or tensioned.

The aperture mask is subject to vibration from external sources (e.g., speakers near the tube). Such vibration varies the positioning of the apertures through which the electron beam passes, resulting in visible display fluctuations. Ideally, these vibrations need to be eliminated or, at least, mitigated to produce a commercially viable television picture tube.

SUMMARY OF THE INVENTION

The present invention provides a split foot damper for reducing vibrational energy in a tension mask having a border. The apparatus controls vibrations of the mask within the cathode ray tube that causes misregistration of the electron beam to the phosphor stripes on the screen. The need to damp these vibrations is essential to the correct operation of the cathode ray tube.

More specifically, the split foot damper has a first element having a first portion in moveable contact with a surface of the border and a second portion in moveable contact with the edge of the border, and a second element having a third portion in moveable contact with the surface of the border and a fourth portion in moveable contact with the edge of the border, where the two elements are connected to each other at a point that is affixed to the surface of the border. As the mask vibrates, the vibrational energy is transferred to the apparatus, wherein vibrational energy is dissipated as the apparatus rubs against the surface and edge of the border.

BRIEF DESCRIPTION OF THE DRAWINGS

The teachings of the present invention can be readily understood by considering the following detailed description in conjunction with the accompanying drawings, in which:

FIG. 2 is a perspective view of the split foot damper attached to the tension mask of FIG. 1;

To facilitate understanding, identical reference numerals have been used, where possible, to designate identical elements that are common to the figures.

DETAILED DESCRIPTION

Figure 1:
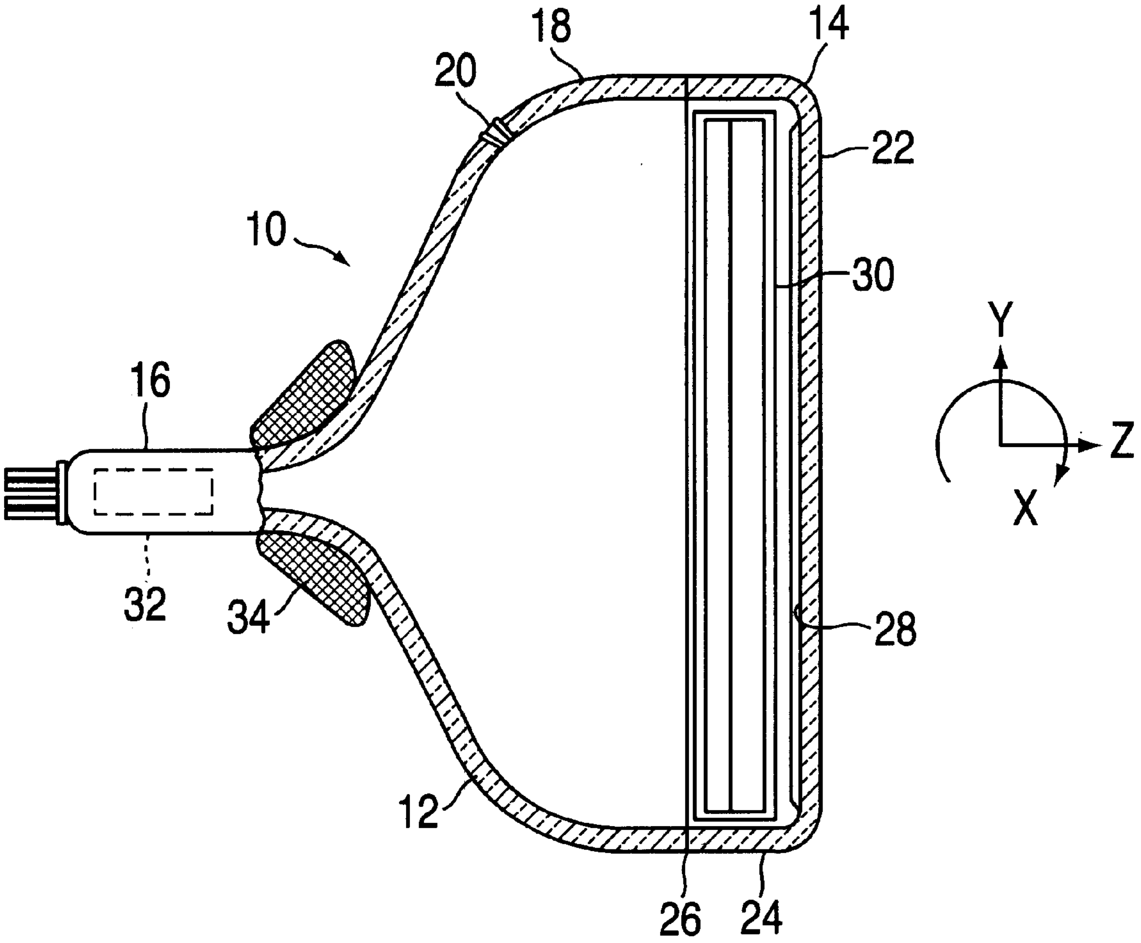
FIG. 1 is a side view, partly in axial section, of a color picture tube, including a tension mask-frame-assembly according to the present invention.

FIG. 1 shows a cathode ray tube 10 having a glass envelope 12 comprising a rectangular faceplate panel 14 and a tubular neck 16 connected by a rectangular funnel 18. The funnel 18 has an internal conductive coating (not shown) that extends from an anode button 20 to a neck 16. The panel 14 comprises a viewing faceplate 22 and a peripheral flange or sidewall 24 that is sealed to the funnel 18 by a glass frit 26. A three-color phosphor screen 28 is carried by the inner surface of the faceplate 22. The screen 28 is a line screen with the phosphor lines arranged in triads, each triad including a phosphor line of each of the three colors. A tension mask 30 is removably mounted in a predetermined spaced relation to the screen 28. The mask may be either a tension focus mask or a tension mask. An electron gun 32 (schematically shown by the dashed lines in FIG. 1) is centrally mounted within the neck 16 to generate three in-line electron beams, a center beam and two side beams, along convergent paths through the mask 30 to the screen 28.

The tube 10 is designed to be used with an external magnetic deflection yoke, such as the yoke 34 shown in the neighborhood of the funnel to neck junction. When activated, the yoke 34 subjects the three beams to magnetic fields that cause the beams to scan horizontally and vertically in a rectangular raster over the screen 28.

The tension mask 30, as shown in FIG. 2, is interconnected to a peripheral frame (not shown) that includes two long sides 36 and 38, and two short sides 40 and 42. The two long sides 36 and 38 of the frame parallel a central major axis, X, of the tube; and the two short sides 40 and 42 parallel a central minor axis, Y, of the tube. The major axis and minor axis are along the plane of the mask 30. The tension mask 30 includes an apertured portion 44 (apertures not shown) that contains a plurality of metal strips having a multiplicity of elongated slits there between that parallel the minor axis of the mask. The tension mask 30 has a border 45 having an edge 47.

Figure 3:
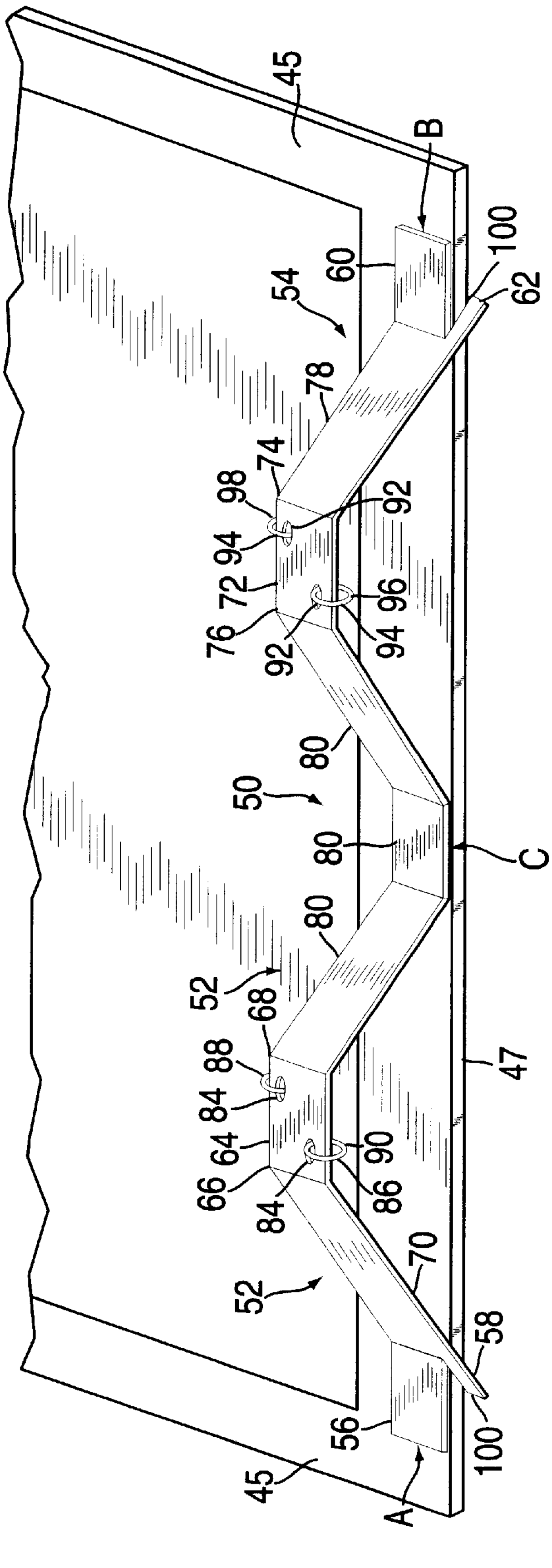
FIG. 3 depicts a split foot damper.

FIG. 3 depicts a split foot damper 50. Specifically, split foot damper 50 comprises a first element 52 having a first portion 56 in moveable contact with a surface of border 45 and a second portion 58 in moveable contact with an edge 47 of the border 45. A second element 54 having a third portion 60 in moveable contact with the surface of the border 45 and a fourth portion 62 in moveable contact with the edge 47 of the border 45.

The first and second elements 52, 54 are connected to each other at a center region or point C that is affixed to the surface of border 45. The split foot damper 50 is coupled to the border 45 of mask 30 on the short sides 40,42. More specifically, split foot damper 50 is attached to the border 45, for example, by welding at the center region or point C.

Figure 4:
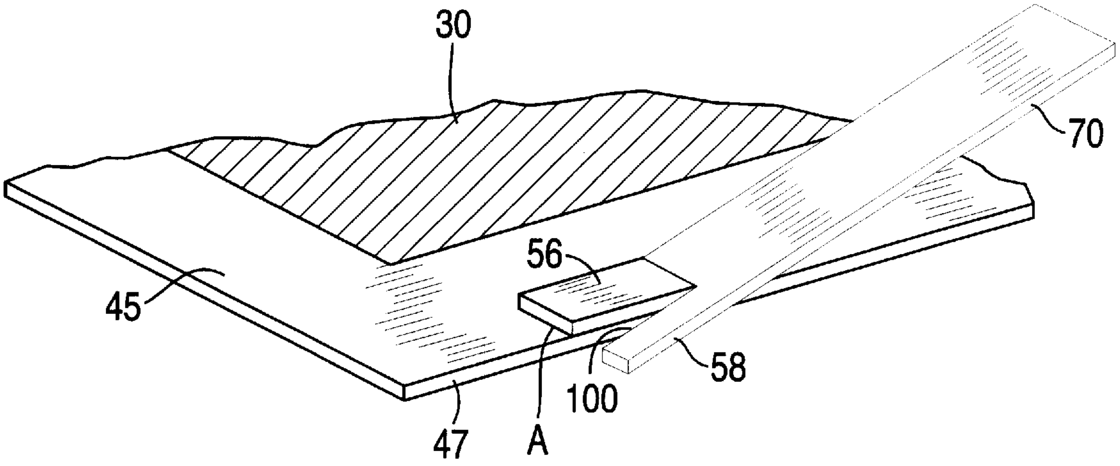
FIG. 4 depicts a split foot portion of the split foot damper in contact with a the border of the tension mask.

In one embodiment, first element 52 comprises a first arm 64 having a first outer end 66 and a first inner end 68. A first leg 70 having a first portion 56 and second portion 58 extends downward from the first outer end 66 of first arm 64. The first portion 56 of first leg 70 is in moveable contact with the surface of the border 45 (See FIG. 4). Second portion 58 is angled below the first portion 56 and is in moveable contact with an edge 47 of the border 45.

In another embodiment there is a gap 100 between first and second portions 56 and 58 and between third and fourth portions 60 and 62 to ensure second and fourth portions 58 and 62 are not in contact with the edge 47 of the border 45 when no vibrational energy is on the mask 30.

In an alternative embodiment, there is no gap 100 between first and second portions 56 and 58 and between third and fourth portions 60 and 62. Rather first portion 56 and third portion 60 are positioned so that a section of portion 56 and 60 over hang the edge 47 of the border 45. Thus, preventing second portion 58 and fourth portion 62 from contacting the edge 47 of the border 45 unless there is vibrational energy being communicated to split foot damper 50.

Second element 54 comprises a second arm 72 having a second outer end 74 and a second inner end 76. A second leg 78 having a third portion 60 and a fourth portion 62 extends downward from the outer end 74 of second arm 72. The third portion 60 of second leg 78 is in moveable contact with the surface of the border 45. Fourth portion 62 is angled below third portion 60 and is in moveable contact with an edge 47 of the border 45.

When first portion 56 and third portion 60 vibrate in the plane of the mask 30, the angular bend of second portion 58 and fourth portion 62 prevent the first and third portions 56 and 60 from moving into the apertured portion 44 of the mask 30 and blocking the electron beams.

In a first embodiment of the invention, first portion 56 and third portion 60 can be larger than second portion 58 and fourth portion 62. In a second embodiment, second portion 58 and fourth portion 62 can be the same size as first portion 56 and third portion 60. In a third embodiment, second portion 58 and fourth portion 62 can be larger than first portion 56 and third portion 60. However, in a preferred embodiment, the ratio in size between first and third portions 56 and 60 to second and fourth portions 58 and 62 is about a 4 to 1 ratio.

Portion 80 connects the inner end 68 of first arm 64 to the inner end 76 of second arm 72. Portion 80 is located proximate the center of split foot damper 50. Portion 80 is affixed to the surface of the border 45 at a region or point C. Alternatively, portion 80 could be V-shaped or some other shape having a trough that contacts the surface of the border 45.

Split foot damper 50 can be comprised of stainless steel, invar and the like. Additionally, split foot damper 50 can be fabricated from strip stock having a constant width resulting in little waste of material.

In the preferred embodiment of the present invention, the first arm 64 has a first plurality of apertures 84 disposed thereon. A ring from a first plurality of rings 86 is disposed within each aperture in the first plurality of apertures 84 and comprises a first inner ring 88 and a first outer ring 90. The first plurality of rings 86 are shown illustratively as being two rings but those skilled in the art will appreciate that at least one ring may be used and still fall within the scope of the invention.

The second arm 72 has a second plurality of apertures 92 disposed thereon. A ring from a second plurality of rings 94 is disposed within each aperture in the second plurality of apertures 92 and comprises a second inner ring 96 and a second outer ring 98. The spacing of the rings on each of first and second arm 64,72 are spaced 0.5 inches apart and each of the rings is 0.1 inches in radius.

When a mask 30 is subject to vibrations from external sources, the mask 30 vibrates at a predefined frequency which is linked to the length of the mask 30 and the tension of the mask 30. The predefined frequency is generally about 80 Hz, which is independent of the size of a television set. The vibrational energy is also on the border 45 of the mask. Split foot damper 50 is designed to match the 80 Hz frequency. Specifically, each half of split foot damper 50 is designed to a specific length, width and thickness to arrive at this frequency.

More specifically, the split foot damper 50 is tuned to the resonant frequency of the mask 30. Vibrational energy causes the mask 30 to move predominantly in the z-axis. As the mask moves in the in the z-axis first portion 56 and third portion 60 vibrate in the x-axis and the y-axis contacting the surface of the border 45 of the mask 30 and "scrubbing away" vibrational energy.

As the split foot damper 50 vibrates in the x-axis, second portion 58 and fourth portion 62 may moveably contact the edge 47 of the border 45 scrubbing away additional vibrational energy.

Additionally, vibrational energy is also transferred to the arms 64, 72 of split foot damper 50 resulting in the plurality of rings 86,94 vibrating and dissipating the vibrational energy of the mask 30.

Although a specific structure of elements 51 and 54 are described, other shapes and structures can be used to provide the vibration damping effect.

As the embodiments that incorporate the teachings of the present invention have been shown and described in detail, those skilled in the art can readily devise many other varied embodiments that still incorporate these teachings without departing from the spirit of the invention.

What is claimed is:

1. A split foot damper for reducing vibrational energy in a tension mask, the tension mask having a border with an edge, comprising:

a first element having a first portion in moveable contact with a surface of the border and a second portion in moveable contact with the edge of the border;

a second element having a third portion in moveable contact with the surface of the border and a fourth portion in moveable contact with the edge of the border, where the first element is connected to the second element at a region that is affixed to the surface of the border.

2. The apparatus of claim 1, wherein the first element comprises a first arm having a first outer end and a first inner end.

3. The apparatus of claim 1, wherein the second element comprises a second arm having a second outer end and a second inner end.

4. The apparatus of claim 2, wherein a first leg extends from the first arm forming the first and second portions.

5. The apparatus of claim 4, wherein a second leg extends from the second arm forming the third and fourth portions.

6. The apparatus of claim 1, wherein the first portion is larger than the second portion.

7. The apparatus of claim 1, wherein the third portion is larger than the fourth portion.

8. The apparatus of claim 2, wherein a first plurality of rings is disposed in a first plurality of apertures on the first arm.

9. The apparatus of claim 3, wherein a second plurality of rings is disposed in a second plurality of apertures on the second arm.

10. The apparatus of claim 1, wherein there is a gap between first and second portions.

11. The apparatus of claim 1, wherein there is a gap between third and fourth portions.

* * * * *